United States Patent [19]

Shimizu

[11] Patent Number: 4,656,409
[45] Date of Patent: Apr. 7, 1987

[54] ELECTROMAGNETIC SERVO UNIT

[75] Inventor: Yasuo Shimizu, Tochigi, Japan

[73] Assignee: Honda Giken Kogyo Kabushiki Kaisha, Tokyo, Japan

[21] Appl. No.: 746,829

[22] Filed: Jun. 19, 1985

[30] Foreign Application Priority Data

| Jun. 22, 1984 | [JP] | Japan | 59-129582 |
| Jun. 22, 1984 | [JP] | Japan | 59-129584 |
| Jun. 22, 1984 | [JP] | Japan | 59-129585 |
| Jun. 22, 1984 | [JP] | Japan | 59-129586 |

[51] Int. Cl.$^4$ ............................................. G05D 17/00
[52] U.S. Cl. ......................................... 318/689; 318/2; 180/79.1; 74/388 PS
[58] Field of Search ............... 318/689, 2; 180/79.1; 74/388 PS

[56] References Cited

U.S. PATENT DOCUMENTS

| Re. 23,550 | 9/1952 | Staude | 318/2 |
| 2,754,465 | 7/1956 | Breir | 318/675 X |
| 2,877,656 | 3/1959 | Orr | 74/388 PS |
| 3,188,540 | 6/1965 | Lautzenhiser | 318/689 |
| 3,191,109 | 6/1965 | Hepner | 318/2 |
| 3,511,104 | 5/1970 | Piat | 180/79.1 X |
| 4,437,531 | 3/1984 | Urabe | 318/2 |
| 4,530,413 | 7/1985 | Buike et al. | 180/79.1 |

FOREIGN PATENT DOCUMENTS 56-4973  1/1981  Japan.
58-141963  8/1983  Japan.

Primary Examiner—Benjamin Dobeck
Attorney, Agent, or Firm—Armstrong, Nikaido, Marmelstein & Kubovcik

[57] ABSTRACT

An electromagnetic servo unit is constituted with an outer casing (1), a first shaft (4) and a second shaft (5) both rotatably supported by the casing, an electric motor (2) built in the casing coaxially with the second shaft, a torque detecting mechanism (4b, 29, 27, 41, 42, 34, 35) for detecting torque applied to either of the first and second shafts, a control mechanism (34, 35, 41, 42) for receiving a detection signal from the torque detecting mechanism and controlling operation of the electric motor, and a transmission mechanism (8; 280) for transmitting an output of the electric motor. The torque detecting mechanism is arranged inside the casing, and the first and second shafts are mutually actuatably connected to each other within the casing through the torque detecting mechanism. Preferably, the first and second shafts are coaxially supported by the casing, and have a relative angular displacement therebetween made use of for, when it is developed exceeding a predetermined angle range, closing an operation control circuit (C; D) of the electric motor.

12 Claims, 9 Drawing Figures

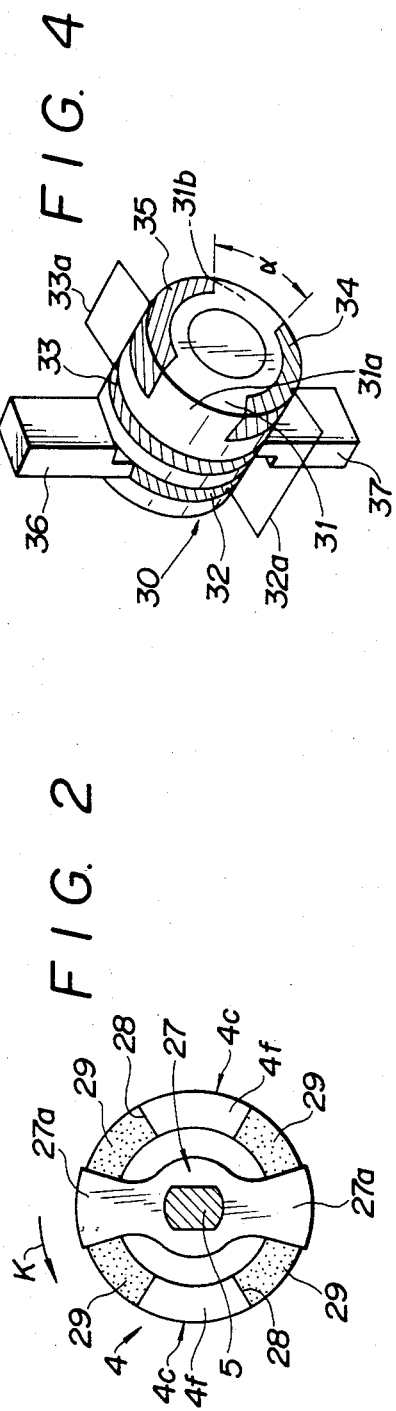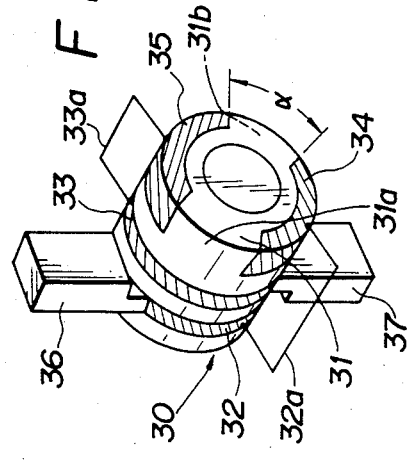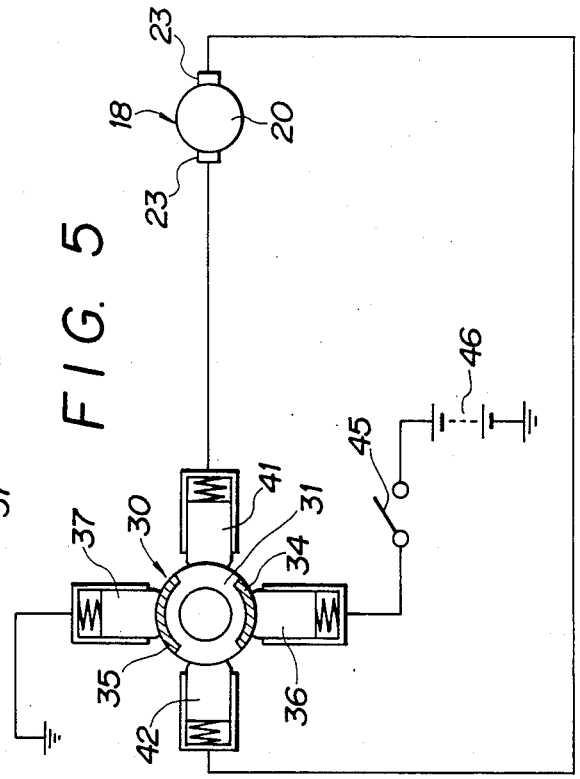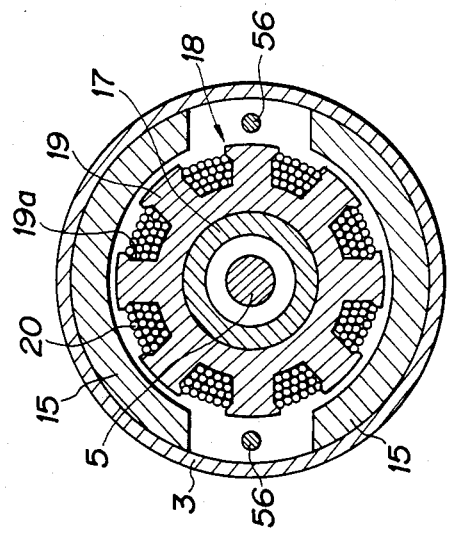

ELECTROMAGNETIC SERVO UNIT

BACKGROUND OF THE INVENTION

1. Field of the Invention

The present invention generally relates to a servo unit. More particularly, the invention relates to an electromagnetic servo unit of the type in which input torque is electromagnetically servo-controlled to be output.

2. Description of Relevant Art

Most of conventional servo systems, exemplarily of those applied to power steering systems for vehicles, are constituted mainly by use of a hydraulic mechanism.

Such a conventional hydraulic servo system, as it is applied to a power steering system for vehicles, includes a constitution in which hydraulic oil from a hydraulic pump is sent under pressure into a servoactuator such as a hydraulic power cylinder or hydraulic servomotor for servo control of input torque from a steering wheel, to provide a controlled output for an operating element to be actuated, in accordance with operational condition of the steering wheel.

In such a hydraulic servo system, however, there are involved problems such that a hydraulic pump is normally put in service, whether or not an effective input is given from a steering wheel, thus uselessly consuming power, and that not a few component parts are employed such as an actuator, hydraulic pump, control valve, and oil reservoir, occupying a relatively large space as a whole, raising difficulty such as when trying to attain a compact, lightweight design and cost economy.

To overcome such problems of a hydraulic servo system, there have been already proposed a number of electromagnetic servo systems; exemplarily in U.S. Pat. Publication No. 2,754,465 in which an electromagnetic servo system is applied to a power steering system for vehicles. According to this U.S. Patent, the electromagnetic servo system includes a direct-current motor coaxially arranged on a steering shaft interposed between a steering wheel as an input member of the power steering system and a gear as an output member thereof, and a torque sensor of a well-known strain gauge type attached to the steering shaft, the torque sensor detecting torque as applied from the steering wheel to the steering shaft, to thereby control the direct-current motor.

Though having effectively solved conventional problems attendant the hydraulic servo system to certain extent, the electromagnetic servo system according to the U.S. Patent, in which the strain gauge type torque sensor is not provided with sufficient consideration for protection, stands susceptive to disturbances such as by dust, moisture, and external forces.

Moreover, in the electromagnetic servo system, power assistance by torque is directly made to the steering shaft from the direct-current motor which, thus, has to be of a high-output type and hence be of a large size, so that the entire system is sized relatively large.

Further, in the electromagnetic servo system, the strain gauge type torque sensor, as well as a limit switch for detecting the direction of stress developed in the steering shaft, is disposed at a separate point on the steering shaft with respect to the direct-current motor, and besides, at a place separated from the steering shaft, an amplifier with a power unit is provided, receiving signals from the torque sensor and the limit switch, for controlling output torque of the direct-current motor. As a result, the entire system is complicated.

On the other hand, there has been proposed another electromagnetic servo system in Japanese Patent Lay-Open Print No. 58-141963 laid open on Aug. 23, 1983. The electromagnetic servo system according to this Japanese Lay-Open Print, which is applied to a power steering system for vehicles, includes an electromagnetic motor coaxially arranged on a pinion shaft of the power steering system of a rack and pinion type, and a planetary gearing coaxially arranged on the pinion shaft, through which gearing an output of the motor is reduced of rotation speed before being applied to the pinion shaft, so that torque of the output applied to the pinion shaft is magnified the more for the speed reduction through the planetary gearing.

In the electromagnetic servo system according to the Japanese Lay-Open Print, the provision of the planetary gearing as a reduction gearing effectively eliminates the need of using a motor so high of the output.

However, also in the electromagnetic servo system according to the Japanese Lay-Open Print, there are separately arranged with respect to the electromagnetic motor a torque detector for detecting torque applied to the pinion shaft as an input side member and a control mechanism receiving a detection signal from the detector to thereby control output torque of the motor. As a result, like the case of the aforementioned U.S. Patent, the servo system is susceptive to disturbances and, besides, complicated.

Further, in the servo system according to the Japanese Lay-Open Print, the electromagnetic motor is controlled so as to always have torque output in proportion to the steering torque as applied to the pinion shaft from a steering wheel, thus being inherently bound to unnecessary consumption of power.

The present invention has been achieved to effectively solve such problems of a conventional electromagnetic servo system, in a further improved form.

SUMMARY OF THE INVENTION

According to the present invention there is provided an electromagnetic servo unit comprising an outer casing, a first shaft and a second shaft both rotatably supported by the casing, an electric motor having an armature coaxially and rotatably arranged around the second shaft and a field arranged inside the casing, a torque detecting means for detecting torque applied to either of the first shaft and the second shaft, a control means for, receiving a detection signal from the torque detecting means, controlling operation of the electric motor, and a transmission mechanism for transmitting rotatory force of the armature of the electric motor, wherein the torque detecting means (4b, 29, 27, 41, 42, 34, 35) is arranged inside the casing (1), and the first shaft (4) and the second shaft (5) are mutually actuatably connected to each other within the casing (1) through the torque detecting means (4b, 29, 27, 41, 42, 34, 35).

Preferably, the first shaft (4) and the second shaft (5) are coaxially supported by the casing (1), the torque detecting means (4b, 29, 27, 41, 42, 34, 35) comprises a part (4b) of the first shaft (4) in the casing (1), a part (27, 27a) of the second shaft (5) in the casing (1), an elastic means (29) interposed between the aforesaid part (4b) of the first shaft (4) and the aforesaid part (27, 27a) of the second shaft (5), an electric resistance assembly (30, 34, 35) fixed on either of the first shaft (4) and the second shaft (5), and a brush (41, 42) secured to the other of the first shaft (4) and the second shaft (5) and adapted to be forced into contact with the electric resistance member (30, 34, 35), and the electric resistance assembly (30, 34, 35) is adapted to cooperate with the brush (41, 42) to close an operation control circuit (C; D) of the electric motor (2) when a relative angular displacement between the first shaft (4) and the second shaft (5) is developed exceeding a predetermined angle range.

Accordingly, an object of the present invention is to provide an electromagnetic servo unit, in which a torque sensor can be effectively protected from disturbances such as by dust, moisture, and external forces.

Another object of the present invention is to provide an electromagnetic servo unit, which is simplified in the structure and effectively feasible of a compact and lightweight design, permitting the fabrication at inexpensive cost, while sufficiently achieving necessary functions.

Still another object of the present invention is to provide an electromagnetic servo unit, which is able to effectively eliminates unnecessary consumption of power.

The above and further objects, details and advantages of the present invention will become apparent from the following detailed description of preferred embodiments of the invention when read in conjunciton with the accompanying drawings.

BRIEF DESCRIPTION OF THE DRAWINGS

In the drawings:

FIG. 2 is a sectional view taken along line II—II of FIG. 1;

FIG. 3 is a sectional view taken along line III—III of FIG. 1;

FIG. 4 is a perspective view of an essential part including a slip-ring assembly of an electric motor of the electromagnetic servo unit of FIG. 1;

FIG. 5 is a diagram of an operation control circuit of the electric motor of the electromagnetic servo unit of FIG. 1;

DETAILED DESCRIPTION OF THE PREFERRED EMBODIMENTS

Figure 1:
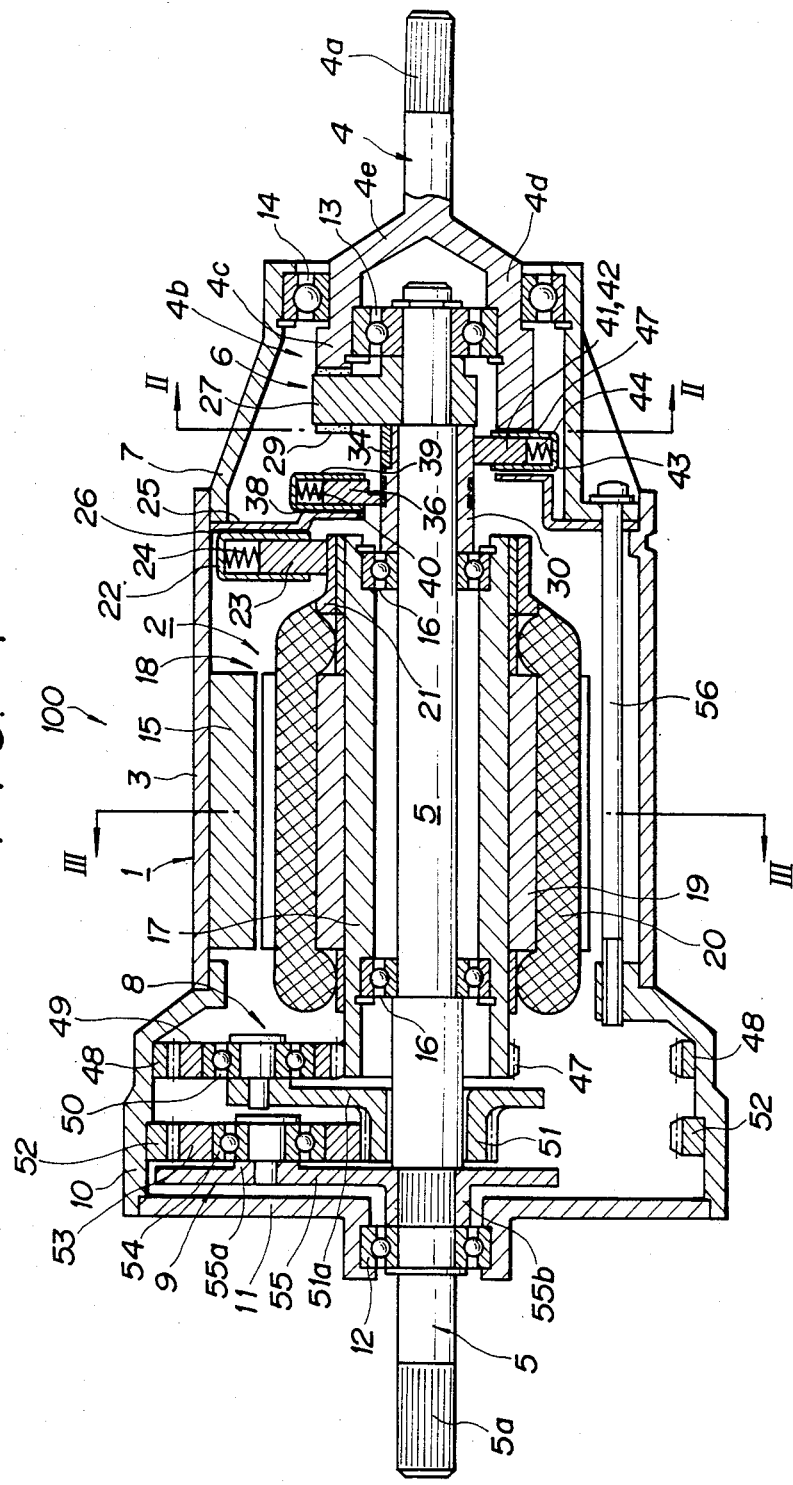
FIG. 1 is a quarter-cutaway longitudinal section of an electromagnetic servo unit according to a first embodiment of the invention.

Referring first to FIG. 1, designated at reference numeral 1 is a cylindrical outer casing of an electromagnetic servo unit 100 according to a first embodiment of the invention. The casing 1 consists of an outside yoke 3 having a direct-current motor 2 built therein, a first casing portion 7 accommodating therein a coupling part 6 interposed between a first shaft 4 and a second shaft 5, and a second casing portion 10 accommodating therein a reduction gearing 8 and a torque-transmitting part 9 interposed between the second shaft 5 and the direct-current motor 2. The second casing portion 10, which also is substantially of a cylindrical form, has a circular lid 11 fitted in the left opening thereof. The second shaft 5 is rotatably supported, at the left part thereof, by a bearing 12 disposed in the central part of the lid 11 and, at the right part thereof, by another bearing 13 disposed in a left portion as the longitudinally inner end part of the first shaft 4. The first and second shafts 4, 5 are arranged both coaxial with the casing 1, and have at the right end thereof and at the left end thereof splines 4a and 5a formed thereon, respectively, to ensure the fastening thereof with corresponding one of those external members (not shown) to be connected thereto.

Figure 6:
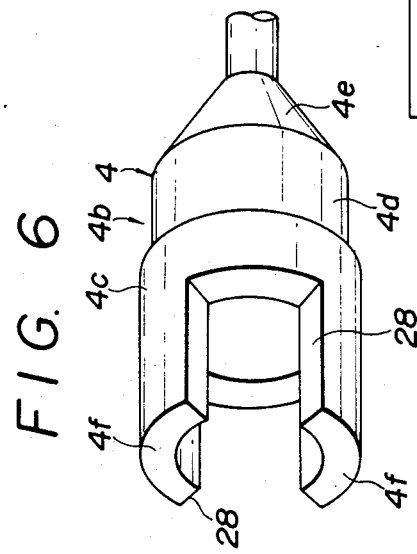
FIG. 6 is a perspective view of an essential part of a first shaft of the electromagnetic servo unit of FIG. 1.

The left part of the first shaft 4 is, as will be seen from FIG. 6 also, formed as a cylindrical portion 4b opening leftwardly, the portion 4b having a lateral contour defined by a pair of sectorial cuts 28, 28 symmetrical to each other with respect to the axis of the shaft 4. The left cylindrical portion 4b of the shaft 4 consists of a large-diameter section 4c including the cuts 28 and a small-diameter section 4d contiguous thereto, while there is formed a conical section 4e between the small-diameter section 4d and the right part of the shaft 4 having the spline 4a.

At the right end opening of the first casing portion 7, between the inner circumference thereof and the outer circumference of the small-diameter section 4d of the first shaft 4, there is interposed a bearing 14 for supporting the first shaft 4 in coaxial alignment with the second shaft 5.

The direct-current motor 2 is constituted by the combination of a symmetrically arranged stationary set (pair, in this embodiment) of arcuate magnets 15, 15 as a field secured to the inner circumference of the yoke 3, on one hand, and an armature 18 as a rotor secured to a cylindrical body 17, which is supported by a pair of bearings 16, 16 on the middle part of the second shaft 5 and adapted to be rotatable thereabout, on the other hand. The armature 18 comprises, as clearly shown in FIG. 3, a laminated steel core as an armature core 19 secured to the cylindrical body 17, the core 19 having an even number of (eight, in this embodiment) relatively long axial slots 19a angularly spaced at a pitch along the outer circumference thereof, a plurality of conductors as an armature winding 20 coiled to be placed in the slots 19a, and a commutator 21 split into a proper number of (four, in this embodiment) pair of segments mounted on the outer circumference of the right end part of the cylindrical body 17, the commutator 21 being connected to the winding 20 so that each pair of commutator segments are connected respectively to one end of any of the conductor coils and to the other end of same. For the commutation in combination with the commutator 21, there are provided a proper number of (two, in this embodiment) brushes 23 slidably fitted each respectively in one of the same number of brush holders 22, each of which has accommodated therein a coiled spring 24 for exerting pressure upon corresponding one of the brushes 23 to be slidably pressed onto the commutator 21. The brush holders 22 are symmetrically arranged to be fixed, through an insulating sheet 26, to an annular plate 25 disposed at the left end of the first casing portion 7.

In the foregoing arrangement, the direct-current motor 2 may be modified to have an increased number of field magnets, that is, poles. In such a modification, there may preferably be used a commutator split into an increased number of segments, while needing a corresponding change in the connection to an armature winding to effectively produce a torque. Also in conjunction with the following description, various modifications may be derived attendant voluntary changes in the pole number or the like, while, for easy understanding, particular references will not be made.

On the inner end of the second shaft 5, that is, on the right end thereof supported by the bearing 13 inside the cylindrical left portion 4b of the first shaft 4, there is fitted an engagement member 27 adjacent to the left end face of the bearing 13 in close vicinity to the rightmost end of the second shaft 5. As shown in FIG. 2, in the region where the engagement member 27 is fitted, the second shaft 5 has a circular sectional form cut at both sides thereof, making the member 27 integrally rotatable therewith, whereas the member 27 is symmetrically designed to have a pair of sectorial arms 27a, 27a.

Further, as shown in FIG. 2, in which the first shaft 4 has a position thereof rotated about the axis thereof by 90 degrees from that of FIG. 6, the arms 27a are each respectively put in a middle region of one of the sectorial cuts 28 in the cylindrical portion 4b of the first shaft 4, while between each of respective both radially extending side faces of the arms 27a and each corresponding side face of the cuts 28 is inserted one of four sectorial rubber pieces 29 for filling a circumferential gap left therebetween. In this respect, not limitting to rubber, the pieces 29 may be of any other elastic material similar thereto. Also the degree of elasticity of such material may be suitably determined.

On the right part of the second shaft 5, between the engagement member 27 and the bearing 16 supporting the right end of the cylindrical body 17, there is mounted a slip-ring assembly 30 of a cylindrical configuration as a whole.

As shown in FIG. 4, the slip-ring assembly 30 comprises a cylindrical insulating member 31, a pair of ring-like copper plates 32, 33 as slip rings both inlaid in the outer circumference of an axially middle part of the insulation member 31, the copper plates 32, 33 being spaced apart from each other in the axial direction of the member 31, and a pair of arcuate carbon plates 34, 35 as resistance segments inlaid in the circumference of a right-end part adjacent to the middle part of the right edge of the member 31, the carbon plates 34, 35 being symmetrically arranged with respect to the axis of the member 31, so that the right-end part of the member 31 includes a pair of radially exposed sectorial portions 31a, 31b each respectively extended circumferentially to define a predetermined angle α of circumference between the carbon plates 34, 35. The assembly 30 has extended therethough a lead wire 32a for the electrical connection between copper plate 32 and carbon plate 34 and another lead wire 32b for connection between copper plate 33 and carbon plate 35, the lead wires 32a, 32b being connected to the circumferentially middle parts of the carbon plates 34, 35, respectively, whereas in FIG. 4 such connections are shown in the form of an external wiring for the purpose of easy understanding. For cooperation with the slip-ring assembly 30, there are provided a pair of brushes 36 and 37 pressed onto, to be in slidable contact with, the copper plates 32 and 33, respectively, which brushes 36, 37 are each respectively slidably fitted in one of a pair of brush holders 39 (either shown in FIG. 1) secured through an insulating sheet 38 to the right side of the annular plate 25, the brush holders 39 each respectively accommodating therein one of a pair of coiled springs 40 (either shown in FIG. 1) for normally biassing the brushes 36, 37 toward the copper plates 32, 33, respectively. Moreover, there are symmetrically provided another pair of brushes 41, 42 (either shown in FIG. 1) pressed onto the assembly 30, to be put in slidable contact with the carbon plates 34, 35, as required for a commutation thereof while the assembly 30 is rotating, which brushes 34, 35 also are each respectively slidably fitted in one of a pair of brush holders 43 (either shown in FIG. 1) which are each respectively secured at the right side thereof through one of a pair of insulating sheets 47 to one of respective left end faces 4f, 4f (both shown in FIG. 4) of the large-diameter section 4c of the cylindrical portion 4b of the first shaft 4, the brush holders 43 each respectively accommodating therein one of a pair of coiled springs 44 (either shown in FIG. 1) for normally biassing the brushes 41, 42 toward the assembly 30, respectively. The slip-ring assembly 30 as a whole is secured to the second shaft 5 in such a manner that, while the servo unit 100 is out of operation with no torque applied to either the first shaft 4 or the second shaft 5, the brushes 41, 42 cooperating with the carbon plates 34, 35 are pressed onto the circumferentially middle parts of the radially exposed sectorial portions 31a, 31b of the insulation member 31.

As schematically shown in FIG. 5, for actuation and output control of the direct-current motor 2, the servo unit 100 is provided with an electric control circuit C including the respective brushes 23, 23; 36, 37; and 41, 42 as essential control elements, in which the brush 36 in contact with the copper plate 32 as left slip ring is connected through a power switch 45 to a positive terminal of a direct-current power source 46, and the brush 37 in contact with the copper plate 33 as right slip ring, via the earth to a negative terminal of the power source 46, while the brushes 41, 42 in cooperation with the carbon plates 34, 35 as paired resistance segments are each respectively connected to one of the brushes 23, 23 kept in contact with the commutator 21.

The control circuit C may preferably be modified by mutual substitution between brushes 36, 37 and 41, 42, such that the brushes 41, 42 are connected to the positive and negative terminals of the power source 46, and the brushes 36, 37, to the brushes 23, 23. Such modification is all the better for the convenience of fabrication, particularly in respect of the wiring which may well be implemented between the brushes 36, 37 and 23, 23.

Moreover, in a modified example of the above embodiment, the slip-ring assembly 30 may be mounted on the first shaft 4, whereas the the brushes 41, 42 will then be fixed to the second shaft 5.

Referring again to FIG. 1, the reduction gearing 8 provided in the second casing portion 10 includes a first planetary gearing which comprises a first sun gear 47 formed on the left-end outer circumference of the cylindrical body 17, a first ring gear 48 formed on the right inner circumference of the second casing portion 10, and a triple of first planet gears 49 (shown one in FIG. 1) engaged to be interposed between the first sun and ring gears 47, 48, and a second planetary gearing which comprises a second sun gear 51 coaxial with and loose fitted for free rotation on the left part of the second shaft 5, a second ring gear 52 formed on the left inner circumference of the second casing portion 10, and a triple of second planet gears 53 (shown one in FIG. 1) engaged to be interposed between the second sun and ring gears 51, 52. The first planet gears 49 are each respectively fitted on one of a triple of first planetary bearings 50 (shown one in FIG. 1) which are each respectively supported by one of a triple of radially projected arms 51a (shown one in FIG. 1) of the second sun gear 51, while the second planet gears 53 are each respectively fitted on one of a triple of second planetary bearings 54 (shown one in FIG. 1) which are each respectively supported by one of a triple of axial projections 55a (shown one in FIG. 1) formed on the right side of a disc plate 55 fitted in a splined manner on, to be integrally rotatable with, the second shaft 5. The reduction gearing 8 as thus constituted effectively permits relatively high-speed rotations of the armature 18 to be reduced to relatively low-speed rotations of the disc plate 55, as required.

The disc plate 55 has formed in the central part thereof a tubular portion 55b spline-mounted on the second shaft 5 so that, when the second planet gears 53 are caused to revolve about the second shaft 5, the disc plate 55 also rotates, concurrently transmitting a torque of the motor 2 to the second shaft 5.

In the foregoing arrangement, the first casing portion 7 and the second casing portion 10 are assembled together with the yoke 3 put therebetween, by fastening with an adequate number (a pair, in this embodiment as shown in FIG. 3) of long bolts 56 arranged symmetrical (at the left and right in this embodiment) with respect to the axis of the casing 1. Each bolt 56 is applied from a suitable lateral section of the first casing portion 7 to a corresponding lateral section of the second casing portion 10.

The function of the electromagnetic servo unit 100 will be described hereinbelow.

Description will first be made of an application in which the first shaft 4 serves as an input shaft, and the second shaft 5 as an output shaft.

The power switch 45 is now assumed to be closed. Further, the servo unit 100 is now supposed to be in a situation in which external torque is given to rotate the input shaft 4 exemplarily counterclockwise or in the direction of arrow K of FIG. 2, thus causing the brushes 41, 42, which are secured to the left end faces 4f, 4f of the large-diameter section 4c of the left cylindrical portion 4b of the input shaft 4, to revolve in the direction K. In this respect, it should be noted that, for the sectorial arms 27a, 27a located in the cuts 28, 28 of the large-diameter section 4c, the rubber pieces 29 only are adapted to transmit thereto torque of the input shaft 4.

Under such condition, while the load to be born by the output shaft 5 is relatively small, the output shaft 5 will rotate substantially integrally with the input shaft 4, keeping small respective yielding deformations of the rubber pieces 29, so that the relative angular displacement between the input shaft 4 and the output shaft 5 is maintained within a predetermined angle range in which each of the brushes 41, 42 circumferentially secured to the input shaft 4 is kept from entering contact with corresponding ones of the carbon plates 34, 35 as resistance segments of the slip-ring assembly 30 secured to the output shaft 5. Therefore, without electric current sent into the armature winding 20, the direct-current motor 2 is kept from starting. As a result, the external torque exerted on the input shaft 4 is substantially directly transmitted through the rubber pieces 29 to the output shaft 5.

On the other hand, as the load on the output shaft 5 becomes larger, the output shaft 5 failing to rotate in unison with the input shaft 4 will have a larger phase delay developed therebetween, thus correspondingly increasing the relative angular displacement therebetween as well as the yielding deformations of the rubber pieces 29. Particularly, when a preset value for the load on the output shaft 5 is exceeded, the relative angular displacement between the input and output shafts 4, 5 will exceed the predetermined angle range, thus bringing the brushes 41, 42 into contact with the carbon plates 34, 35, respectively. Accordingly, as apparent from FIG. 5, the armature winding 20 necessarily has a designed number of conductor coils thereof connected at their one-side ends through one of the brushes 23, brush 41, carbon plate 34, copper ring 32, brush 36, and power switch 45 to the positive terminal of the power source 46 and at their other-side ends through the other of the brushes 23, brush 42, carbon plate 35, copper ring 33, brush 37, and the earth to the negative terminal of the power source 46, so that an electric current is sent from the power source 46 into the winding 20, causing the armature 18 to rotate in the same direction as the input shaft 4. In other words, the direct-current motor 2 has a torque electromagnetically developed, in the same rotating direction as the input shaft 4, to be additionally applied through the reduction gearing 8 to the output shaft 5, which thus receives a larger torque than the external torque acting on the input shaft 4. The electromagnetic torque is developed only while the brushes 41, 42 are kept in contact with the carbon plates 34, 35. The direct-current motor 2 will stop developing torque when the contact between the brushes 41, 42 and the carbon plates 34, 35 is caused to break with a change in the relative angular displacement between the input and output shafts 4, 5. In this respect, when the application of external torque to the input shaft 4 is interrupted, the rubber pieces 29 normally exerting resilient forces on the engagement member 27 make the input shaft 4 return to an original position thereof, at which the contact between the brushes 41, 42 and the carbon plates 34, 35 is broken, thus interrupting current thererthrough, thereby stopping operation of the motor 2.

When the input shaft 4 is caused to rotate with external torque applied thereto to an extent that the relative angular displacement between the input and output shafts 4, 5 exceeds the predetermined angle range, the direct-current motor 2 will enter operation to electromagnetically develop additional torque, making the output shaft 5 follow rotation of the input shaft 4, so that the output shaft 5 gains a controlled torque as magnified.

Morever, when the relative angular displacement between the input and output shafts 4, 5 is further increased with increase in the load on the output shaft 5, there will be increased respective contact areas between the brushes 41, 42 and the carbon plates 34, 35, besides that the lead wires 32a, 32b connected to the circumferentially middle parts of the carbon plates 34, 35 have decreased resistances with respect to the brushes 41, 42, respectively, whereby electric current to the armature winding 20 becomes increased. It is thus possible to enlarge the torque by the motor 2 in accordance with the load on the output shaft 5.

Such effects as described above can be likewise achieved even when the input shaft 4 is rotated in the opposite direction to arrow K of FIG. 2.

Incidentally, the electromagnetic servo unit 100 described hitherto can be adapted as well to an application in which the second shaft 5 is used as an input shaft, and the first shaft 4, as an output shaft.

In such an application, when the relative angular displacement between the input shaft 5 and the output shaft 4 is caused to exceed the predetermined angle range with increase in the magnitude of load on the output shaft 4 exceeding a predetermined value, the motor 2 starts developing torque to thereby assist the input shaft 5.

The principle of function of the servo unit 100 in such case will be easily understood from the foregoing description and will not be detailed.

In respect of the case using the second shaft 5 as an input shaft, where the torque developed by the motor 2 is applied to the input shaft 5, however, it may be advisable to refer that all the torque applied to the output shaft 4 is to be exerted through the rubber pieces 29.

Figure 7:
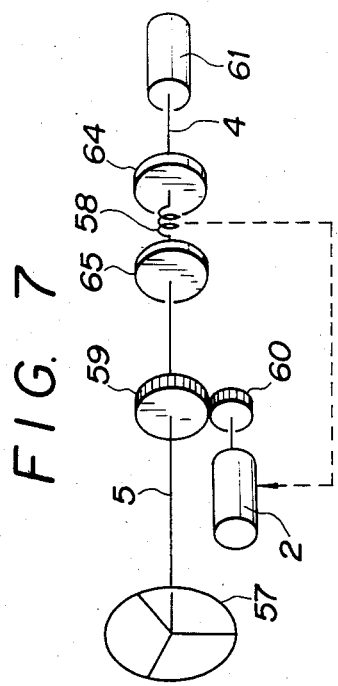
FIG. 7 is a schematic representation of a power steering system with the electromagnetic servo unit of FIG. 1.

Referring now to FIG. 7, which shows a schematic diagram of a power steering system for vehicles constituted as the combination of a well-known steering system and the aforementioned electromagnetic servo unit as conceptionally modelled and as applied by using the second shaft 5 as an input shaft and the first shaft 4 as an output shaft, designated at reference numeral 57 is a steering wheel of the steering system, the steering wheel 57 being connected to the input shaft 5 of the servo unit, and 61 is a certain operational member such as a pinion shaft of a rack and pinion gearing of the system, the member 61 being connected to the output shaft 4 of the unit. Between the input shaft 5 and the output shaft 4, more particularly, between one-end part 65 of the former and one-end part 64 of the latter opposite thereto, there is interposed a torque sensor 58 having a function of torque transmission, which sensor 58 corresponds to the combination of the sectorial arms 27a, 27b and the rubber pieces 29, whereas such a sensor may be constituted by other suitable means. For the control of electromagnetic power assistance, a sensor singal is fed back to the electric motor 2, the output shaft of which has mounted thereon a gear 60 meshing with another gear 59 mounted on the input shaft 5, the gears 60 and 59 corresponding to the first and second planetary gearings of the reduction gearing 8. When a torque developed at the coupling part 6 between the input and output shafts 5, 4 is detected by the torque sensor 58, the electric motor 2 will be operated in response thereto, to apply an additional torque to the input shaft 5, thereby giving the output shaft 4 a larger torque than would be caused without the motor 2.

In the aforementioned power steering system, an electromagnetic torque is added to the input shaft 5, while detecting by the torque sensor 58 a representative value such as the absolute value of a torque developed at the output shaft 4, so that, even at fine fluctuations of load which otherwise would be disturbances to torque output characteristic, there can be achieved a controlled power assistance in which a torque developed at the input shaft 5 is magnified to be transmitted to the output shaft 4 in a stable manner.

Further, in the power steering system of FIG. 7, when the relative angular displacement between the input shaft 5 and the output shaft 4 is increased beyond a predetermined phase difference with increase in the load on the output shaft 4, there will be proportionally caused an increase in the respective contact areas between the brushes 41, 42 and the carbon plates 34, 35 as well as a decrease in the respective resistances between the brushes 41, 42 and the lead wires 32a, 32b, thereby increasing the electric current to the armature winding 20, so that the torque by the electric motor 2 becomes larger in response to the increase of load at the output shaft 4.

As will be understood from the foregoing description, according to the present invention, an electromagnetic servo unit has integrated therewith, as component parts thereof of simplified constitution, a torque detecting mechanism for detecting a torque applied to an input shaft and besides a control mechanism adapted to cooperate with the torque detecting mechanism to receive a signal therefrom for controlling an output torque of an electric motor. Accordingly, in addition to that the torque detecting mechanism is effectively protected against dust, moisture, external forces, and the like which otherwise would be disturbances, the structure of the servo unit itself is favorably simplified, and also an implementation can be achieved in applications of the unit to specified places such as between a steering wheel and a pinion shaft of a rack and pinion type steering system for vehicles.

Moreover, the electric motor is adapted to start operation only when an output shaft receives a load exceeding a predetermined value, thus effectively avoiding unnecessary consumption of power.

Further, the simplified constitution of the torque detecting mechanism successfully permits ensured performance as well as quicker responsiveness of the servo unit.

Furthermore, the output of the electric motor is applied in a reduced form through a planetary gearing, thus permitting the use of a small-sized lightweight electric motor of an inexpensive low-output type rated low in operating current, whereas there is finally provided high torque output.

Still more, the input shaft is substantially directly engaged with the output shaft, without the need of providing a separate fail-safe mechanism.

It will be apparent that, not limitting to a power steering system for vehicles, the electromagnetic servo unit according to the invention may be applied to any other system in which a larger torque than input is needed to be output when necessary.

Figure 8:
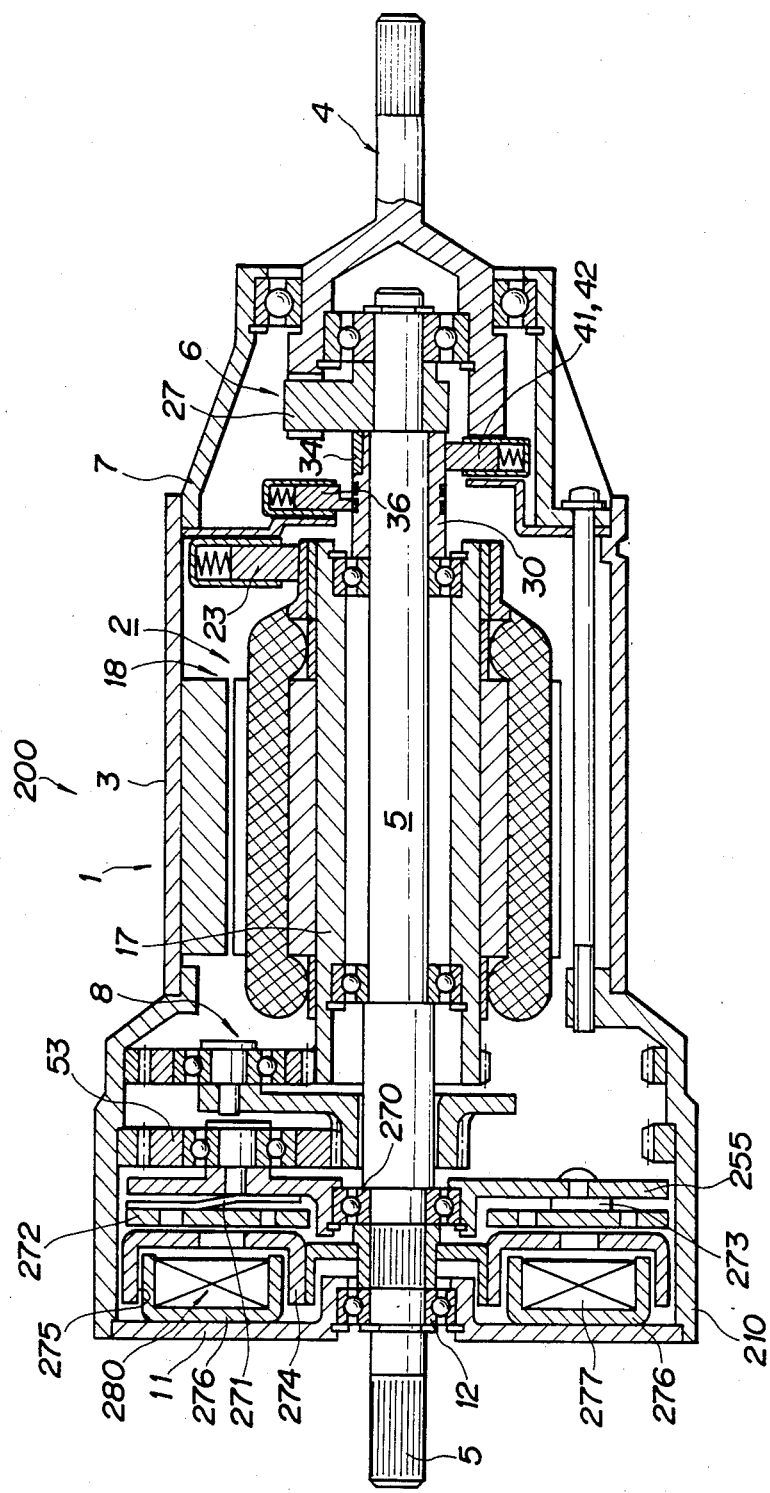
FIG. 8 shows a quarter-cutaway longitudinal section of an electromagnetic servo unit according to a second embodiment of the invention.

Referring now to FIG. 8, which is a longitudinal quarter-cutaway sectional view of an electromagnetic servo unit according to a second embodiment as a modified example of the first embodiment of the present invention, designated at reference numeral 200 is the entirety of the servo unit, in which an electromagnetic clutch 280 is interposed between a second shaft 5 and a disc plate 255 rotatably supporting a triple of second planet gears 53 of a reduction gearing 8. It is advised that, for the second embodiment, like reference numerals designate like parts in conjunction with the first embodiment. Accordingly, the structure as well as function of the servo unit 200 of FIG. 8 is like that of the servo unit 100 described in conjunction with FIGS. 1 to 6, between from a first shaft 4 to the reduction gearing 8, and more particularly, including the first shaft 4, a coupling part 6 functioning as a torque sensor between the first shaft 4 and the second shaft 5, a slip-ring assembly 30, a direct-current motor 2, and the reduction gearing 8.

In the servo unit 200, the disc plate 255 provided in a second casing 210 and adapted to rotatably support the planet gears 53 is rotatably supported at the central part thereof by a bearing 270 fitted on the second shaft 5, so that high-speed rotations of an armature 18 can be reduced as required to rotate the disc plate 255 at desired low speeds. The disc plate 255 has on the left side thereof a plurality of leaf springs 271 each respectively secured thereto at one end thereof and joined at the other end thereof to an annular attractable clutch plate 272 which is thus normally biassed by the leaf springs 271 toward the disc plate 255, whereas to secure a necessary gap between the clutch plate 272 and the disc plate 255 a plurality of elastic members 273 made of a rubber material are interposed therebetween by securing to the disc plate 255.

At the left of the disc plate 255, a rotary member 274 is provided around and secured to the second shaft 5, which member 274 has formed therein an annular recess 275 leftwardly opened. In the annular recess 275 is loose-fitted a bobbin 276 having an annular recess thereof rightwardly opened, the bobbin 276 being secured at the left side thereof to the right side of a circular lid 11. In the annular recess of the bobbin 276 is installed a multi-coil solenoid 277.

While the solenoid 277 is not energized, the clutch plate 272 is kept from contact with and thus disengaged from the rotary member 274, so that the electromagnetic clutch 280 is inoperative. To the contrary, when the solenoid 277 is energized to excite, the clutch plate 272 will be brought into contact and engaged with the rotary member 274, so that the clutch 280 becomes operative.

Figure 9:
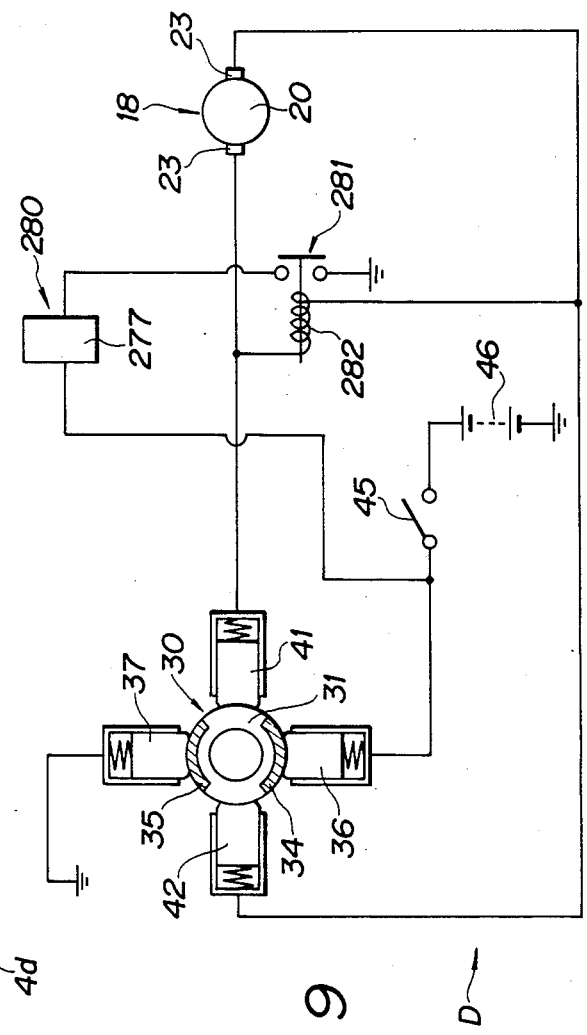
FIG. 9 is a diagram of an operation control circuit of an electric motor of the electromagnetic servo unit of FIG. 8.

As shown in FIG. 9, which is a schematic representation of electrical connections of the electromagnetic clutch 280 and respective brushes constituting a control circuit D for actuation and output control of the electric motor 2 of the servo unit 200, the solenoid 277 of the clutch 280 is connected at one end thereof through a power switch 45 to a positive terminal of a power source 46 and at the other end thereof through a relay switch 281 to the earth constituting a negative terminal of the power source 46. The relay switch 281 has an excitation coil 282 thereof connected in parallel to a pair of brushes 41, 42. When an effective voltage is applied between the brushes 41, 42, the coil 282 will be energized to exert a magnetic effect to close the relay switch 281, whereby the clutch plate 272 will be attracted to and engaged with the rotary member 274. For other elements of the control circuit D than the clutch 280 and the relay switch 281, the electrical connection is like the control circuit C of FIG. 5 and will not be detailed herein.

The function of the electromagnetic servo unit 200 will be described hereinbelow.

Description will first be made of an application in which the first shaft 4 serves as an input shaft, and the second shaft 5 as an output shaft.

The power switch 45 is now assumed to be closed. Further, like the case of the servo unit 100, the servo unit 200 is now supposed to be in a situation in which external torque is given to rotate the input shaft 4 in a direction corresponding to arrow K of FIG. 2.

Under such condition, while the load to be born by the output shaft 5 is smaller than a preset value and thus the relative angular displacement between the input shaft 4 and the output shaft 5 is maintained within a predetermined angle range, the direct-current motor 2 is kept from starting. As a result, the external torque exerted on the input shaft 4 is substantially directly transmitted through four rubber pieces 29 to the output shaft 5.

When the load on the output shaft 5 exceeds the preset value, the relative angular displacement between the input and output shafts 4, 5 also exceeds the predetermined angle range, so that the brushes 41, 42 secured to the input shaft 4 are brought into contact with carbon plates 34, 35 of the slip-ring assembly 30 secured to the output shaft 5, respectively. Accordingly, through circuit connections made like the case of FIG. 5, an electric current is sent from the power source 46 into a winding 20 of the armarture 18, causing the armature 18 to rotate in the same direction as the input shaft 4. An electromagnetic torque developed at the armature 18, that is, a tendency to produce the rotation of the armature 18 will then be transmitted to produce, at the final stage of the reduction gearing 8, rotation of the disc plate 255.

On the other hand, at the time when the brushes 41, 42 are brought into contact with the carbon plates 34, 35 of the slip-ring assembly 30, the excitation coil 282 of the relay switch 281 becomes energized, thus closing the relay switch 281, thereby putting the electromagnetic clutch 280 in operation. In other words, in FIG. 9, when the resistance contact is made between the brushes 41, 42 and the carbon plates 34, 35, respectively, the relay switch 282 has complete connection at one end of the coil 282 through the brush 41, the carbon plate 34, a copper plate 32, a brush 36, and the power switch 45 to the positive terminal of the power source 46 as well as at the other end thereof through the brush 42, the carbon plate 35, a copper plate 33, and a brush 37 to the earth constituting the negative terminal of the power source 46. As a result, any time when the electric motor 2 is in operation, the clutch 280 is necessarily made operative, so that the disc plate 255 fitted for free rotation on the output shaft 5 is integrally coupled with the rotary member 274 secured to the shaft 5, thus transmitting the torque as electromagnetically developed at the motor 2 to the output shaft 5.

The electromagnetic torque is developed only while the brushes 41, 42 are kept in contact with the carbon plates 34, 35. The direct-current motor 2 as well as the electromagnetic clutch 280 becomes inoperative when the aforementioned contact is caused to break with a change in the relative angular displacement between the input and output shafts 4, 5. In this respect, when the application of external torque to the input shaft 4 is interrupted, the rubber pieces 29 normally exerting resilient forces on the engagement member 27 make the input shaft 4 return to an original position thereof, at which the contact between the brushes 41, 42 and the carbon plates 34, 35 is broken, thus interrupting current thererthrough, thereby stopping operation of the motor 2 and the clutch 280.

When the input shaft 4 is caused to rotate with external torque applied thereto to an extent that the relative angular displacement between the input and output shafts 4, 5 exceeds the predetermined angle range, the direct-current motor 2 and the electromagnetic clutch 280 enter operation, so that the motor 2 electromagnetically develop additional torque, making the output shaft 5 follow rotation of the input shaft 4, whereby the output shaft 5 gains a controlled torque as magnified.

Morever, when the relative angular displacement between the input and output shafts 4, 5 is further increased with increase in the load on the output shaft 5, there will be increased respective contact areas between the brushes 41, 42 and the carbon plates 34, 35, in addition to that lead wires 32a, 32b connected to the circumferentially middle parts of the carbon plates 34, 35 have decreased resistances with respect to the brushes 41, 42, respectively, whereby electric current to the armature winding 20 becomes increased. It is thus possible to enlarge the torque by the motor 2 in accordance with the load on the output shaft 5.

Such effects as described above can be likewise achieved even when the input shaft 4 is rotated in the opposite direction to arrow K of FIG. 2.

As detailed above, in the electromagnetic servo unit 200, the electromagnetic clutch 280 is operative in an electrically interlocked manner with the electric motor 2.

Incidentally, like the electromagnetic servo unit 100, the servo unit 200 can be adapted as well to an application in which the second shaft 5 is used as an input shaft, and the first shaft 4, as an output shaft.

The principle of function of the servo unit 200 in such applications will be easily understood from the foregoing description and will not be detailed.

According to the second embodiment of the invention, various advantages like those of the first embodiment can be achieved.

Yet more, in the second embodiment, the electromagnetic clutch 280 is interposed between the reduction gearing 8 and the second shaft 5, so that mechanical connection therebetween can be cut off while the electric motor 2 is out of operation, that is, when additional torque thereof is not required. Therefore, in each case of using either the first or second shaft 4 or 5 as an input shaft, the input shaft can be favorably protected against interference due to such resistance to rotation as otherwise would be given from the electric motor 2 through the reduction gearing 8, while the motor 2 is inoperative. As a result, the external torque applied to the input shaft is effectively transmitted to the output side.

Besides above, the clutch plate 272 of the electromagnetic clutch 280 is held by the leaf springs 271 on the disc plate 255, so that the clutch 280 can be operated with small electric current sent into the solenoid 277, thus permitting ensured torque transmission from the electric motor 2 to the second shaft 5.

It will be understood that the electromagnetic servo unit 200 can be applied to any system that outputs a larger torque than input, when necessary, such as a power steering system for vehicles.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

I claim:

1. An electromagnetic servo unit comprising:
   an outer casing;
   a first shaft and a second shaft both rotatably supported by said casing;
   an electric motor having an armature coaxially and rotatably arranged around said second shaft and a field arranged inside said casing;
   torque detecting means for detecting torque applied to either of said first shaft and said second shaft;
   control means arranged inside said casing, for receiving a detection signal from said torque detecting means, and for controlling operation of said electric motor in accordance therewith; and
   a transmission mechanism for transmitting rotary force of said armature of said electric motor, wherein:
   said torque detecting means is arranged inside said casing; and
   said first shaft and said second shaft are mutually actuatably connected to each other within said casing through said torque detecting means.

2. An electromagnetic servo unit according to claim 1, wherein:
   said transmission mechanism for transmitting rotary force of said armature of said electric motor comprises a planetary reduction gearing interposed between said casing and said second shaft for transmitting rotary motion of said armature to said second shaft while at the same time reducing the speed of said transmitted rotary motion.

3. An electromagnetic servo unit according to claim 2, wherein said transmission mechanism further comprises:
   an electromagnetic clutch interposed between said reduction gearing and said second shaft, said electromagnetic clutch being adapted to be operative in an interlocked manner with operation of said electric motor.

4. An electromagnetic servo unit according to claim 1, wherein said transmission mechanism for transmitting rotary force of said armature of said electric motor comprises an electromagnetic clutch interposed between said armature and said second shaft and adapted to be operative in an interlocked manner with operation of said electric motor.

5. An electromagnetic servo unit according to claim 1, wherein:
   said first shaft and said second shaft are adapted to serve as an input shaft and an output shaft, respectively.

6. An electromagnetic servo unit according to claim 1, wherein:
   said first shaft and said second shaft are adapted to serve as an output shaft and an input shaft, respectively.

7. An electromagnetic servo unit, comprising:
   an outer casing;
   a first shaft and a second shaft both rotatably and coaxially supported in said casing;
   an electric motor having an armature coaxially and rotatably arranged around said second shaft and a field arranged inside said casing;
   torque detecting means arranged inside said casing, for detecting torque applied to either of said first shaft and said second shaft, said first shaft and said second shaft being mutually actuatably connected to each other within said casing through said torque detecting means, said torque detecting means including:
   a part of said first shaft within said casing;
   a part of said second shaft within said casing;
   elastic means interposed between said part of said first shaft and said part of said second shaft;
   an electrical resistance assembly fixed on either of said first shaft and said second shaft; and
   a brush means secured to the other of said first shaft and said second shaft and adapted to be forced into contact with said electrical resistance assembly; and
   a transmission mechanism for transmitting rotary force of said armature of said electric motor;
   wherein said electrical resistance assembly and said brush means of said torque detecting means are adapted to close an operation control circuit of said electric motor when a relative angular displacement between said first shaft and said second shaft is developed exceeding a predetermined angle range.

8. An electromagnetic servo unit according to claim 7, wherein said part of said first shaft in said casing comprises:
   a cylindrical portion formed at an inner end of said first shaft, said cylindrical portion having a sectorial cut at a lateral side thereof;
   and wherein said part of said second shaft in said casing comprises:
   a laterally extending arm formed at an inner end of said second shaft, said arm extending into said cut of said cylindrical portion;
   and wherein said elastic means comprises:
   an elastic member interposed between said cut of said cylindrical portion and said arm of said second shaft for filling a space therebetween.

9. An electromagnetic servo unit according to claim 7, wherein:
   said electric resistance assembly is constituted by a cylindrical insulating member forming a body part thereof and an arcuate resistance plate fixed to an outer circumference of said insulating member, such that said electric resistance assembly has along a circumference thereof adjacent to said resistance plate an exposed portion of said insulating member exposed to extend over a predetermined circumferential angle, said electric resistance assembly being fixed on either of said first shaft and said second shaft so that, when said relative angular displacement between said first shaft and said second shaft is kept within said predetermined angle range, said exposed portion of said insulating member is brought into contact with said brush means and, when said relative angular displacement is developed exceeding said predetermined angle range, said resistance plate is brought into contact with said brush means;
   and wherein said resistance plate, when it is brought into contact with said brush means, closes said operation control circuit of said electric motor.

10. An electromagnetic servo unit according to claim 9, wherein:
    said resistance plate of said electric resistance assembly comprises a pair of arcuate resistance segments symmetrically fixed on the circumference of said cylindrical insulating body;
    said brush means secured to said other of said first shaft and said second shaft comprises a pair of brush elements symmetrically fixed onto same, such that when neither of said first shaft and said second shaft have torque applied thereto, said brush elements are each respectively forced into contact with a circumferentially middle part of said exposed portion of said insulating member between said resistance segments, so that said electric motor is kept from operating;
    and wherein said brush elements are each respectively always connected to either of one of both ends of a winding of said armature of said electric motor and one of both poles of a power source for said electric motor, and said resistance segments are each respectively always connected to the other of same.

11. An electromagnetic servo unit according to claim 10, wherein:
    said arcuate resistance segments of said electrical resistance assembly are each respectively electrically connected at a circumferentially middle part thereof to said other of one of both ends of said winding of said armature and one of both poles of said power source.

12. An electromagnetic servo unit according to claim 11, wherein a control means for receiving a detection signal from said torque detecting means and for controlling operation of said electric motor in accordance therewith is arranged inside said casing and comprises:
    said resistance segments of said electrical resistance assembly; and
    said brush elements.

* * * * *